United States Patent
Chang

(10) Patent No.: US 8,624,708 B2
(45) Date of Patent: Jan. 7, 2014

(54) ITEM POSITIONING SYSTEM AND METHOD THEREOF

(75) Inventor: Chih Yen Chang, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 719 days.

(21) Appl. No.: 12/547,057

(22) Filed: Aug. 25, 2009

(65) Prior Publication Data

US 2010/0079257 A1 Apr. 1, 2010

(30) Foreign Application Priority Data

Sep. 26, 2008 (TW) .............................. 97137151 A

(51) Int. Cl.
*H04Q 5/22* (2006.01)
*G08B 13/14* (2006.01)

(52) U.S. Cl.
USPC ........................... 340/8.1; 340/10.1; 340/10.5

(58) Field of Classification Search
CPC .............. G08B 13/14; G08G 1/09; H04Q 5/22
USPC ........... 340/8.1, 825.49, 905, 505, 10.1–10.5, 340/572.1; 235/385; 705/28
See application file for complete search history.

(56) References Cited

U.S. PATENT DOCUMENTS

| | | | | |
|---|---|---|---|---|
| 6,040,774 A * | 3/2000 | Schepps | ..................... | 340/572.1 |
| 6,057,756 A * | 5/2000 | Engellenner | ................... | 340/505 |
| 6,097,301 A * | 8/2000 | Tuttle | ......................... | 340/693.9 |
| 6,552,661 B1 * | 4/2003 | Lastinger et al. | .......... | 340/572.1 |
| 6,600,418 B2 * | 7/2003 | Francis et al. | .............. | 340/572.1 |
| 6,720,888 B2 * | 4/2004 | Eagleson et al. | .............. | 340/905 |
| 6,917,290 B2 * | 7/2005 | Land | ......................... | 340/539.1 |
| 7,030,731 B2 * | 4/2006 | Lastinger et al. | ............ | 340/10.1 |
| 7,038,584 B2 * | 5/2006 | Carter | ...................... | 340/539.13 |
| 7,084,740 B2 * | 8/2006 | Bridgelall | ................. | 340/10.42 |
| 7,176,797 B2 * | 2/2007 | Zai et al. | .................... | 340/572.1 |
| 7,423,535 B2 * | 9/2008 | Chung et al. | ................ | 340/572.4 |
| 7,932,830 B2 * | 4/2011 | Campero et al. | ........... | 340/572.7 |
| 2006/0109125 A1 * | 5/2006 | Overhultz et al. | ......... | 340/572.1 |

FOREIGN PATENT DOCUMENTS

CN 1790371 A 6/2006
CN 101010967 A 8/2007

OTHER PUBLICATIONS

Chinese Patent Office, Office Action 0810346CN, Jun. 7, 2011, pp. 1-6.

* cited by examiner

*Primary Examiner* — Nam V Nguyen
(74) *Attorney, Agent, or Firm* — Edell, Shapiro & Finnan, LLC

(57) ABSTRACT

An item positioning system is provided. The item positioning system comprises a plurality of tag readers and a control device. The plurality of tag readers generate access signals respectively and receive a response signal from a target tag. The control device adjusts transmitting power of the access signals of the tag readers, and determines a position of the target item according to whether the tag readers receive the response signal.

7 Claims, 4 Drawing Sheets

ITEM POSITIONING SYSTEM AND METHOD THEREOF

CROSS REFERENCE TO RELATED PATENT APPLICATION

This patent application is based on Taiwan, R.O.C. patent application No. 97137151 filed on Sep. 26, 2008.

FIELD OF THE INVENTION

The present invention relates to radio frequency identification (RFID), and more particularly, to an item positioning system using an RFID tag and a method thereof.

BACKGROUND OF THE INVENTION

RFID technology is a non-contact automatic identification technology implementing a tag and a reader. A small RFID tag chip is set on or embedded in a product, and product data stored in the RFID tag chip is sent to the reader for tracking. Using RFID technology as a goods tracking system or an access control system can greatly reduce manual operations. Therefore, more and more RFID technologies are being applied to factory automation, goods sales, toll systems and vehicle identification.

In a shopping mall or a supermarket, the types of goods for sale are diversified and complex. A conventional method of manually managing and searching goods needs tremendous manpower and time, and is sometimes ineffective in practice. Hence, the conventional method is not a good mechanism for managing goods.

Presently, a common goods search system used in a shop or store records the position or area of every good in the shop. When a customer or a shop assistant wishes to search for a position or area of a certain good, he inputs the name or keyword of the good into the goods search system and obtains the exact position from the goods search system. However, if the position of the good is changed, e.g., the good is moved to another area by a customer, the customer or the shop assistant can not successfully find the good from the goods search system.

Therefore, there is a need for improving goods search systems.

SUMMARY OF THE INVENTION

An item positioning system is provided according to a first embodiment of the present invention. The item positioning system determines a position of a target item to which a target tag is attached. In practice, the target tag is a high frequency (HF) RFID tag.

The item positioning system comprises a plurality of tag readers and a control device. The tag readers correspond to a plurality of predetermined positions within a space. The tag readers generate access signals respectively and optionally receive a response signal generated by the target tag. The control device, coupled to the tag readers, optionally adjusts transmitting power of the access signals generated by the tag readers. The control device determines the position of the target item according to whether the tag readers receive the response signal.

An item positioning method is provided according to a second embodiment of the present invention. The item positioning method is used to determine a position of a target item. In this embodiment, a target tag is attached to the target item. In practice, the target tag is a HF RFID tag.

In the method, a plurality of tag readers are controlled to generate access signals respectively, and are corresponding to a plurality of predetermined positions within a space. Transmitting power of the access signals generated by the tag readers is optionally adjusted according to whether the tag readers receive a response signal generated by the target item. The position of the target item is determined according to whether the number of the tag readers receiving the response signal is smaller than a predetermined value.

In conclusion, an item positioning system according to the present invention determines whether a plurality of tag readers provided at different positions within a same space can access a target tag. Accordingly, the item positioning system according to the present invention optionally controls transmitting power of the tag readers to narrow down a range and a position of the target tag. Compared to the prior art, the item positioning system according to the invention can correctly position the position of the target tag and determine a current position of the target item. Therefore, the item positioning system of the invention may be particularly useful for purposes of searching for positions of goods in a shop, or for books in a library, among other uses.

The following description and figures are provided to better understand details and attendant advantages of the present invention.

DETAILED DESCRIPTION OF THE PREFERRED EMBODIMENT

An objective of the present invention is to control transmitting power of a tag reader to narrow down the search range according to the response of the target tag and, ultimately, find the target tag.

Figure 1:
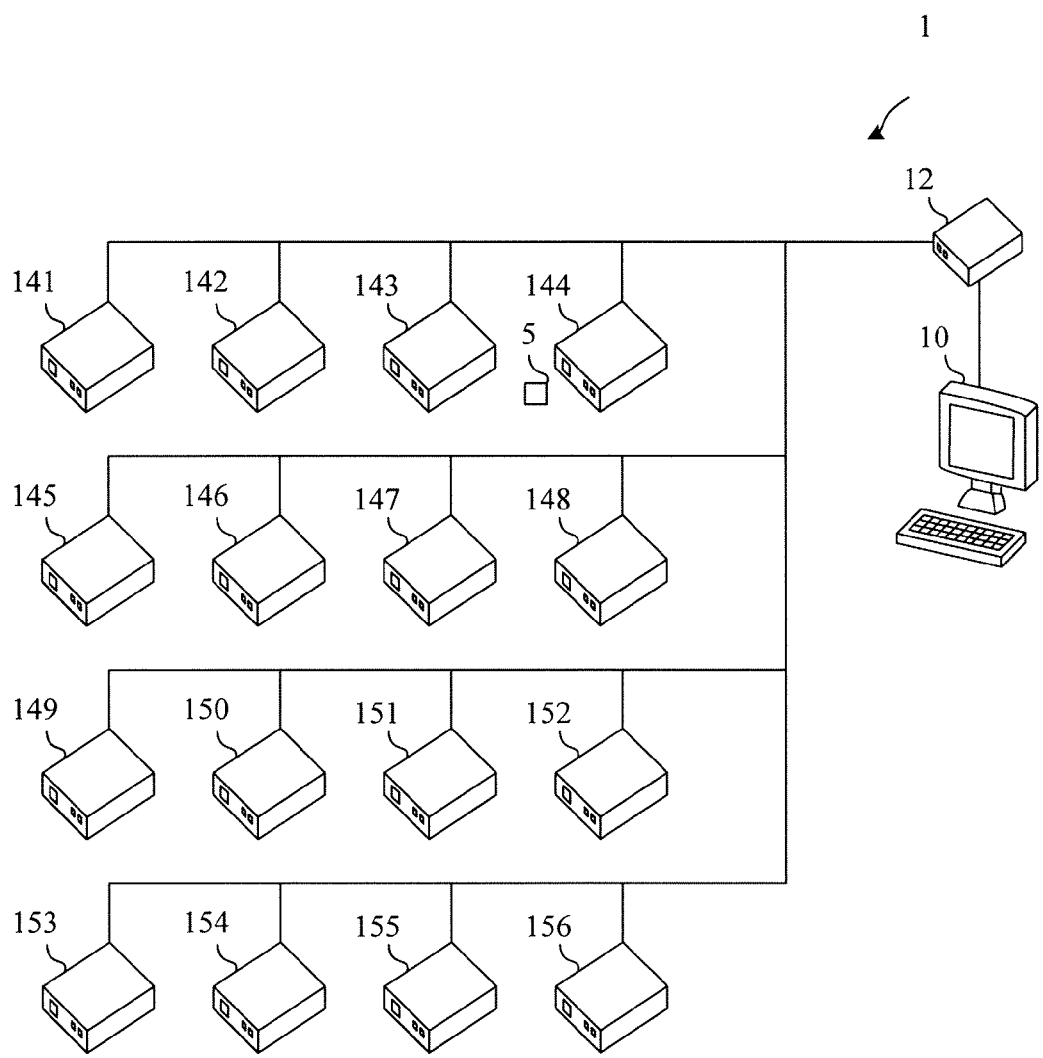
FIG. 1 is a schematic diagram of an item positioning system in accordance with a first embodiment of the present invention.

An item positioning system is provided according to a first embodiment of the present invention. The item positioning system deployed in a convenience store is used for determining a position of a target good with an identification tag, such as a certain drink. An identification tag, such as a high frequency RFID tag, is attached to the target good. FIG. 1 shows a schematic diagram of the item position system comprising a control device 10, a transforming device 12 and sixteen tag readers 141 to 156.

For example, the control device 10 is coupled to the transforming device 12 via Ethernet, and the transforming device 12 is coupled to the tag readers 141 to 156 via a power line network or Ethernet.

In this embodiment, the tag readers 141 to 156 are respectively provided at different positions in the convenience store. For example, the tag reader 141, inserted in an electric socket, is coupled to the transforming device 12 via the power line network, and the transforming device 12 is coupled to the control device 10 via Ethernet. A function of the transforming device is to convert different signal formats between the power line network and Ethernet.

Figure 2A:
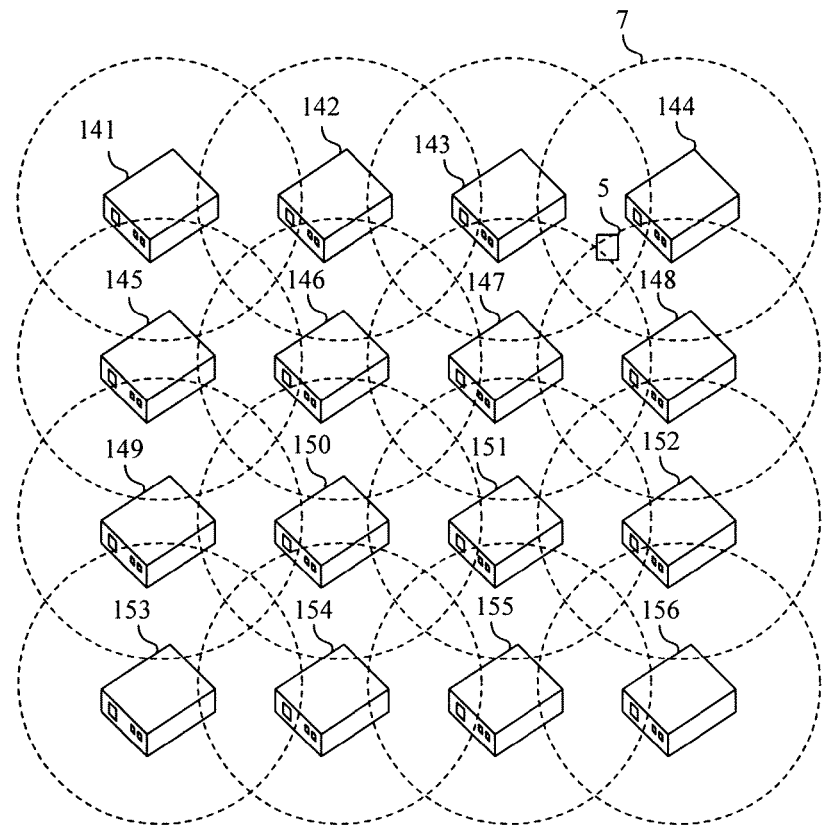
FIG. 2 (a) and FIG. 2(b) are examples that an item positioning system positions items.
Figure 2B:
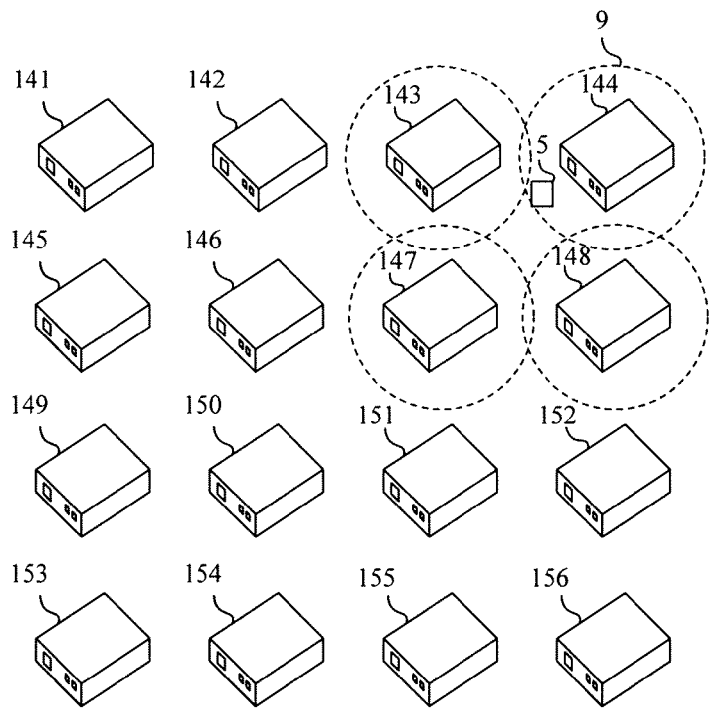

When a shop assistant of the convenience store wishes to find a current position of a target good attached with the target tag 5 by the item positioning system 1, the shop assistant operates the control device 10 to generate a control signal to each of the tag readers 141 to 156. In the process, the transforming device 12 is used to convert the control signal and transmit the converted control signal to the readers 141 to 156. When receiving the control signal respectively, each of the tag readers 141 to 156 generates an access signal and transmits the access signal within a first range as illustrated in FIG. 2 (*a*).

In practice, each of the tag readers 141 to 156 adjusts transmitting power of the access signal to change the transmitting range of the access signal. For example, when transmitting power of the access signal of the tag reader 141 is increased, the transmitting range of the access signal is expanded. In this embodiment, suppose that the first ranges of the tag readers 141 to 156 are the same; that is, each of the tag readers 141 to 156 transmits the access signal with the same transmitting power.

Whether the target good is in the first ranges of the access signals transmitted by the tag readers is to be further discussed below. Referring to FIG. 2 (*a*), when the target good with the target tag 5 is in the first range of the access signal transmitted by the tag reader device 144, the target tag 5 shall receive the access signal. According to the access signal, the target tag 5 then generates a response signal, which is subsequently received by the tag reader 144.

Having received the response signal, the tag reader 144 generates a successful access signal according to the response signal and transmits the same to the control device 10. If the control device 10 receives the successful access signal sent by the tag reader 144, it means that the tag reader 144 can access the target tag 5 attached to the target good. That is, the target tag 5 is located in the first range of the access signal of the tag reader 144.

Still referring to FIG. 2 (*a*), the target tag 5 attached to the target good is obviously outside the first range of the access signal of the tag reader 141. Indeed, the target tag 5 is not able to receive an access signal transmitted by the tag reader 141, and hence the target tag 5 does not generate a response signal according to the access signal of the tag reader 141. The tag reader 141 does not receive the response signal from the target tag 5. Therefore, the tag reader 141 will not transmit a successful access signal to the control device 10. If the control device 10 does not receive the successful access signal sent by the tag reader 141, it means that the tag reader 141 is not able to access the target tag 5 attached to the target good. That is, the target tag 5 is not located in the first range of the access signal of the tag reader 141.

It is apparent from the above description that, the control device 10 determines whether each of the tag readers 141 to 156 can access the target tag 5, according to whether the control device 10 receives successful access signals respectively sent by each of the tag readers 141 to 156. As shown in FIG. 2 (*a*), only the tag readers 143, 144, 147 and 148 can access the target tag 5. That is, the item positioning system 1 can determine an approximate position of the target tag 5, which is positioned near an intersection area of the first ranges of the tag readers 143, 144, 147 and 148.

However, the foregoing positioning result obtained by the item positioning system 1 is not accurate enough. Accordingly, the control device 10 of the item positioning system 1 adjusts transmitting power of the access signals of the tag readers according to the foregoing positioning result.

In this embodiment, only the tag readers 143, 144, 147 and 148 are able to access the target tag 5; that is, the target tag 5 is positioned near the tag readers 143, 144, 147 and 148. Therefore, in order to further narrow down the positioning range and get a more accurate positioning result, the control device 10 decreases transmitting power of the access signals of the tag readers 143, 144, 147 and 148 and sets transmitting power of access signals of other tag readers as zero. As a result, only the tag readers 143, 144, 147 and 148 transmit access signals again within second ranges.

Referring to FIG. 2 (*b*), transmitting power of the access signals of the tag readers 143, 144, 147 and 148 are decreased. Therefore, the second ranges are smaller than the original first ranges, i.e., access ranges of the tag readers 143, 144, 147 and 148 are further decreased to achieve an objective of more accurately positioning the target tag 5. It is assumed that the second ranges of the tag readers 141 to 156 are the same, i.e., the access signals of the tag readers 141 to 156, according to the second ranges, are supposed to have the same transmitting power.

Referring to FIG. 2 (*b*), the target good is located in the second range of the access signal of the tag reader 144. At this point, the target tag 5 attached to the target good receives the access signal transmitted by the tag reader 144 and generates a response signal according to the access signal. The tag reader 144 then generates a successful access signal according to the response signal and transmits the same to the control device 10. If the control device 10 receives the successful access signal sent by the tag reader 144, it means that the tag reader 144 can access the target tag 5 attached to the target good. That is, the target tag 5 is in the second range of the access signal transmitted by the tag reader device 144.

If the control device 10 does not receive the successful access signals sent back to the tag readers 143, 147 and 148, it means that the target good is outside the second ranges of the access signals transmitted by the tag readers 143, 147 and 148. Therefore, the target tag 5 attached to the target good does not receive the access signals transmitted by the tag readers 143, 147 and 148.

As mentioned above, the control device 10 only receives the successful access signal from the tag reader 144. Hence, the position of the target tag 5 is narrowed down to the second range of the tag reader 144 by the item position system 1. Accordingly, the item positioning system 1 can accurately position a correct position of the target good currently located in the convenience store.

Figure 3A:
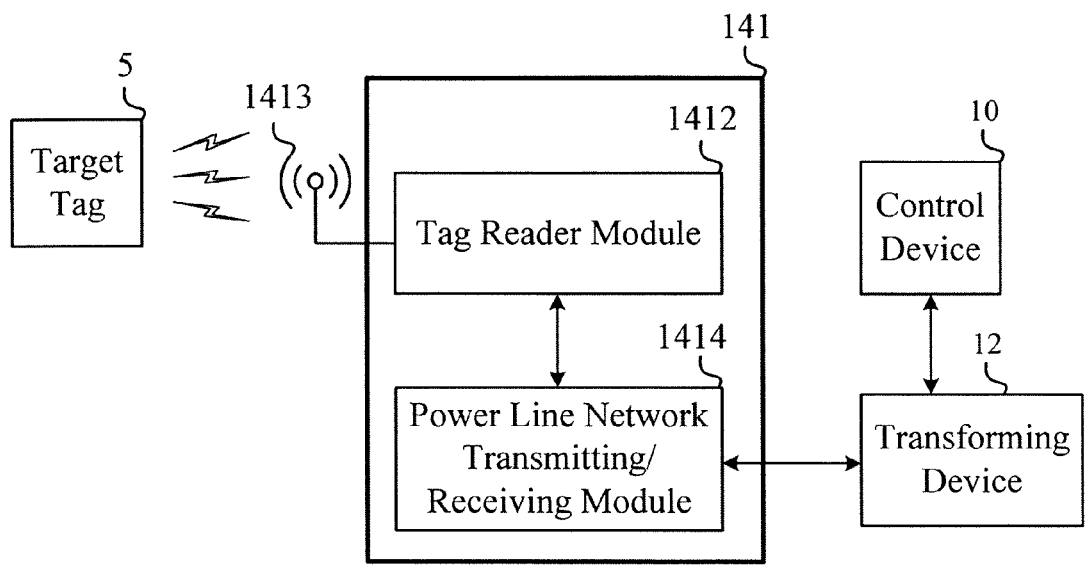
FIG. 3 (a) and FIG. 3(b) are respectively functional block diagrams of a tag reader 141 and 142 as illustrated in FIG. 1.
Figure 3B:
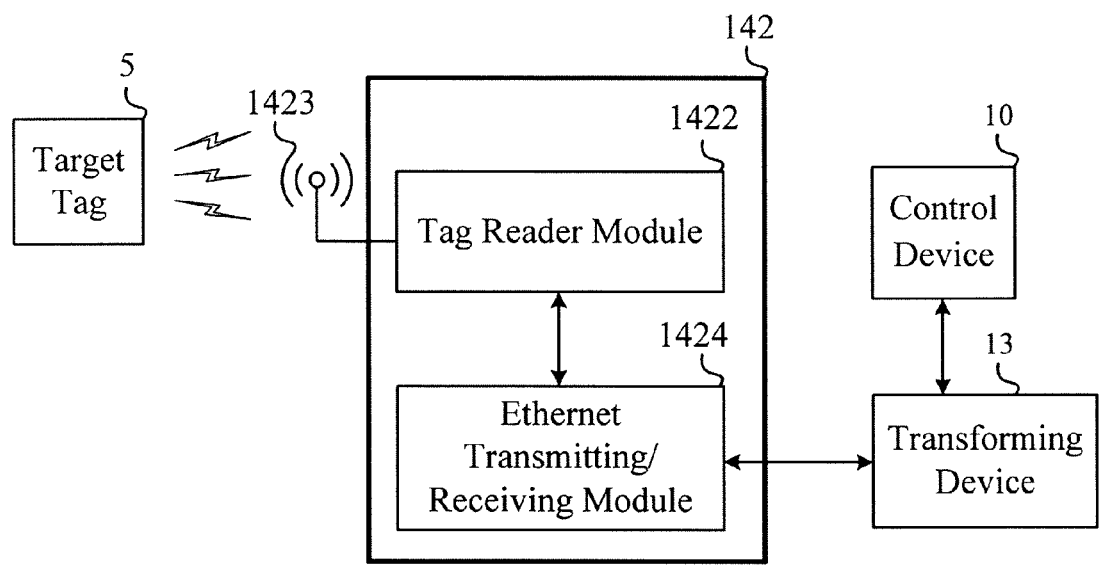

In this embodiment, the tag reader can be provided in a general electric socket and coupled to a transforming device via the power line network. The tag reader 141 in FIG. 1 is taken as an example to be discussed below. Referring to FIG. 3 (*a*), the tag reader device 141 comprises a tag reader module 1412 and a power line network transmitting/receiving module 1414. The tag reader module 1412 comprises an antenna 1413. The power line network transmitting/receiving module 1414 is coupled to the transforming device 12 via the power line network. The transforming device 12 is coupled to the control device 10 via Ethernet, and hence a control signal generated by the control device is first transmitted to the transforming device 12 via Ethernet. After the signal format of the control signal is converted by the transforming device, the control signal is then transmitted to the transmitting/receiving module 1414 via the power line network. The tag reader module 1412 receives the control signal from the power line network transmitting/receiving module 1414 and sends an access signal via the antenna 1413 according to the control signal.

In addition, when receiving the response signal of the target tag 5 via the antenna 1413, the tag reader module 1412 shall generate a successful access signal and transmit the successful access signal from the power line network transmitting/receiving module 1414 to the transforming device 12 via the power line network. After the signal format of the successful access signal is converted by the transforming device 12, the successful access signal is transmitted to the control device 10 via Ethernet. Upon receiving the successful access signal, the control device 10 adjusts transmitting power of the access signal sent from the antenna 1413 of the tag reader module 1412 according to the successful access signal.

In practice, the power line network transmitting/receiving module 1414 is coupled to the tag reader module 1412 via a Serial Peripheral Interface (SPI), a universal asynchronous receiver/transmitter (UART), an Inter-Integrated Circuit (I2C) or a Universal Serial Bus (USB).

The tag reader can be coupled to the transforming device via Ethernet. The tag reader 142 in FIG. 1 is taken as an example to be discussed below. Referring to FIG. 3 (*b*), the tag reader 142 comprises a tag reader module 1422 and an Ethernet transmitting/receiving module 1424. The tag reader 1422 comprises an antenna 1423. The Ethernet transmitting/receiving module 1424 is coupled to a transforming device 13 via Ethernet, and the transforming device 13 is coupled to the control device 10 via Ethernet as well. Therefore, the control signal generated by the control device 10 is transmitted from the transmit device 13 to the Ethernet transmitting/receiving module 1424 via the Ethernet. The tag reader module 1422 then receives the control signal from the Ethernet transmitting/receiving module 1424 and sends an access signal via the antenna 1423 according to the control signal.

In addition, when the response signal of the target tag 5 via the antenna 1423 is received, the tag reader module 1422 generates a successful access signal and sends the same from the Ethernet transmitting/receiving module 1424 to the control device 10 through the transforming device 13 via the Ethernet. When the control device 10 receives the successful access signal, the control device 8 adjusts transmitting power of the access signal sent from the antenna 1423 of the tag reader module 1422 according to the successful access signal.

In practice, the Ethernet transmitting/receiving module 1424 is coupled to the tag reader module 1422 via an SPI, a UART, an I2C or a USB.

Figure 4:
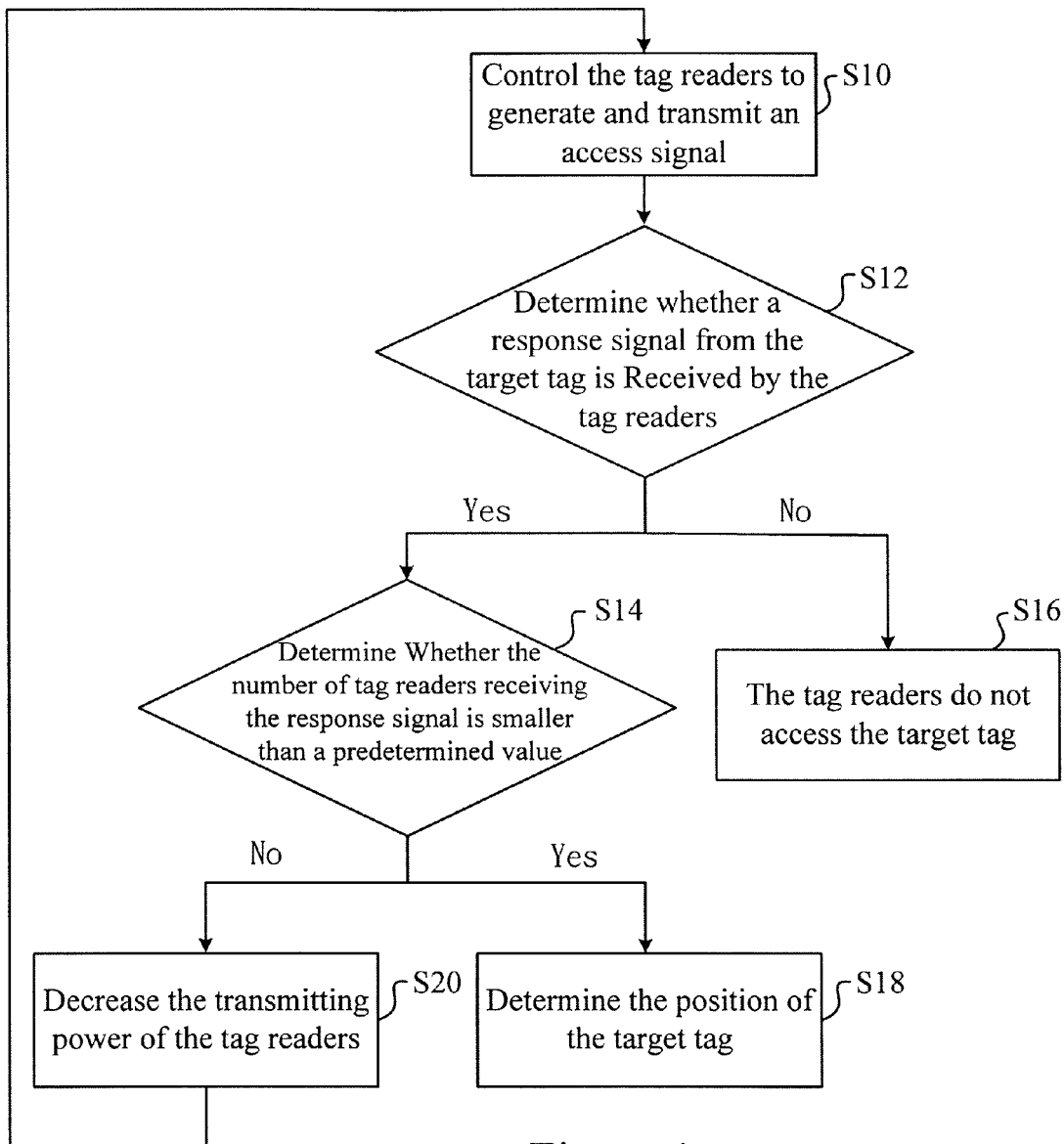
FIG. 4 is a flow chart of an item positioning method in accordance with a second embodiment of the present invention.

An item positioning method is provided according to a second embodiment of the present invention, so as to determine a position of a target item having a target tag and a plurality of tag readers corresponding to a plurality of positions within a space. FIG. 4 shows a flow chart of the item positioning method.

In this embodiment, the item positioning method begins with Step S10 of controlling each tag reader to generate and transmit an access signal within a first range. In Step S12, whether tag readers receive a response signal from the target tag is determined. Two outcomes are possible: tag readers receive the response signal or tag readers do not receive a response signal.

When a certain tag reader does not receive the response signal, Step S16 is executed. Specifically, in Step S16, it is determined that the tag reader can not access the target tag. Accordingly, no further processing is performed with respect to that tag reader. When the tag reader receives the response signal, Step S14 is executed. In Step S14, whether the number of tag readers receiving the response signal is smaller than a predetermined value is further determined.

When the determination result of Step S14 is yes, i.e., when the number of tag readers receiving the response signal is smaller than the predetermined value, it means that the positioning range is accurate enough, and Step S18 is executed. In Step S18, the position of the target item is determined according to the positions of the tag readers having received the response signal. Note that this could be based on a single tag reader.

When the determination result of Step S14 is no, i.e., when the number of tag readers receiving the response signals is not smaller than the predetermined value, it means that the positioning range is not accurate enough, and Step S20 is executed. In Step S20, transmitting power of the access signals of the tag readers having received the response signals is decreased. Step S10 is then executed again. In Step S10, the transmitting power of the tag readers that received the response signals is adjusted to transmit access signals within second ranges. That is, the transmitting power of the access signals is decreased. Hence, the second ranges of the access signals of the tag readers are smaller than the first ranges.

In conclusion, an item positioning system according to the present invention determines whether a plurality of tag readers provided at different positions within a same space can access a target tag. Accordingly, the item positioning system according to the present invention optionally controls transmitting power of the tag readers to narrow down a possible range and a position of the target tag. Compared to the prior art, the item positioning system can correctly position the position of the target tag and determine a current position of the target item. Therefore, the item position system may be particularly useful for, e.g., purposes of searching for positions of goods in a shop or books in a library.

While the invention has been described in terms of what is presently considered to be the most practical and preferred embodiments, it is to be understood that the invention need not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. An item positioning system for determining a position of a target item to which a target tag is attached, comprising:
   a plurality of independent tag readers each located at one of a plurality of predetermined separate positions within a same space, and each configured to respectively generate a plurality of access signals and to receive a response signal generated by the target tag, wherein each of the tag readers comprises:
      a tag reader module configured to generate an access signal according to a control signal, to transmit the access signal within a predetermined range, and to generate a successful access signal according to whether the tag reader module receives the response signal from the target tag;
   a transforming device coupled to each of the tag readers via a power line network; and
   a control device coupled to the transforming device via Ethernet and configured to adjust transmitting power of the access signals of selected tag readers according to whether the selected tag readers generated the successful access signal and to determine the position of the target item according to whether the tag readers receive the response signal,
   wherein the transforming device receives the access signals from the tag readers on the power line network and is configured to convert power line network access signals to Ethernet access signals for transmission to the control device, and wherein the transforming device receives the control signal from the control device via Ethernet and is configured to convert an Ethernet control signal to a power line network control signal for sending to the tag readers.

2. The item positioning system as claimed in claim 1, wherein the target tag is a high frequency (HF) radio frequency identification (RFID) tag.

3. The item positioning system as claimed in claim 1, wherein the predetermined range corresponds to transmitting power of the access signal.

4. The item positioning system as claimed in claim 1, wherein if the target tag is located in the predetermined range, the target tag receives the access signal and generates the response signal according to the access signal.

5. The item positioning system as claimed in claim 1, wherein one of the tag readers further comprises:
   a power line network transmitting/receiving module, coupled to the tag reader module, and connected to the transforming device via a power line network, for receiving the control signal from the control device.

6. The item positioning system as claimed in claim 5, wherein the power line network transmitting/receiving module is coupled to the tag reader module via a Serial Peripheral Interface (SPI), a universal asynchronous receiver/transmitter (UART), an Inter-Integrated Circuit (I2C) or a Universal Serial Bus (USB).

7. A positioning method for determining a position of a target item to which a target tag is attached, comprising steps of:
   generating a control signal at a control device;
   transmitting the control signal to a transforming device via Ethernet,
   converting the control signal received via Ethernet to a power line network control signal for transmission to a plurality of independent tag readers via a power line network;
   controlling the plurality of tag readers to generate access signals respectively, according to the control signal, wherein the plurality of tag readers are each located at one of a plurality of predetermined separate positions within a same space;
   transmitting the access signals within predetermined ranges, wherein when the target item is located in the predetermined ranges, the target tag generates response signals according to the access signals;
   generating, at one or more of the plurality of tag readers, respective successful access signals according to whether the plurality of tag readers receive response signals generated by the target tag;
   transmitting the successful access signals to the transforming device via the power line network;
   converting the access signals received on the power line network to Ethernet access signals for transmission to a control device via Ethernet;
   adjusting transmitting power of the access signals of the tag readers according to whether the tag readers generated the successful access signal; and
   determining the position of the target item according to whether the number of the tag readers receiving the response signals is smaller than a predetermined value.

* * * * *